US006383661B2

(12) United States Patent
Wittebrood et al.

(10) Patent No.: US 6,383,661 B2
(45) Date of Patent: May 7, 2002

(54) METHOD OF MANUFACTURING AN ALUMINUM PRODUCT

(75) Inventors: Adrianus Jacobus Wittebrood, Velserbroek; Jacques Hubert Olga Joseph Wijenberg, Amsterdam; Joop Nicolaas Mooij, Castricum, all of (NL)

(73) Assignee: Corus Aluminium Walzprodukte GmbH, Koblenz (DE)

( * ) Notice: Subject to any disclaimer, the term of this patent is extended or adjusted under 35 U.S.C. 154(b) by 0 days.

(21) Appl. No.: 09/849,238

(22) Filed: May 7, 2001

Related U.S. Application Data

(63) Continuation-in-part of application No. 09/573,980, filed on May 19, 2000.

(30) Foreign Application Priority Data

Sep. 25, 2000 (EP) .............................. 00203304
Feb. 21, 2001 (EP) .............................. 01200628

(51) Int. Cl.$^7$ .................... B32B 15/01; B32B 15/20; C25C 3/56; C25C 5/44; B23K 103/10
(52) U.S. Cl. .................. 428/650; 428/652; 428/654; 428/935; 205/255; 228/262.51
(58) Field of Search ................. 428/652, 935, 428/654, 658, 650; 205/255, 185, 213; 106/1.27, 1.22, 1.12; 228/209, 206, 262.51

(56) References Cited

U.S. PATENT DOCUMENTS

| 2,745,799 A | 5/1956 | Patrie ............................ 204/38 |
| 2,821,014 A | 1/1958 | Miller ......................... 29/197.5 |
| 2,821,505 A | * 1/1958 | Bench ........................... 205/255 |
| 3,482,305 A | 12/1969 | Dockus et al. .................. 29/487 |
| 3,489,657 A | 1/1970 | Brenan et al. ................. 204/38 |
| 3,597,658 A | 8/1971 | Rivera ..................... 317/234 R |
| 3,963,454 A | 6/1976 | Singleton, Jr. .............. 29/197.5 |
| 3,970,237 A | 7/1976 | Dockus ........................ 228/208 |
| 4,028,200 A | 6/1977 | Dokus ........................ 204/43 T |
| 4,157,154 A | 6/1979 | Scott et al. ................... 228/140 |
| 4,164,454 A | 8/1979 | Schober ......................... 204/28 |
| 4,388,159 A | 6/1983 | Dockus et al. ................. 204/33 |
| 4,602,731 A | 7/1986 | Dockus ........................ 228/121 |
| 4,670,312 A | * 6/1987 | Ehrsam ........................ 427/438 |
| 4,721,653 A | 1/1988 | Oda et al. ................. 428/472.2 |
| 4,741,811 A | 5/1988 | Lefebvre et al. ............... 204/28 |
| 5,069,980 A | 12/1991 | Namba et al. ............... 428/654 |
| 5,245,847 A | 9/1993 | Bando et al. .................... 72/47 |
| 5,422,191 A | 6/1995 | Childree ....................... 428/654 |
| 5,466,360 A | 11/1995 | Ehrsam et al. ............... 205/170 |
| 5,601,695 A | 2/1997 | Muranushi .................. 205/213 |
| 5,643,434 A | 7/1997 | Benmalek et al. ........... 205/109 |
| 6,129,262 A | 10/2000 | Cooper et al. ............... 228/208 |

FOREIGN PATENT DOCUMENTS

| DE | 3821073 | | 1/1989 |
| EP | 0227261 | | 7/1987 |
| FR | 2354171 | * | 1/1978 |
| FR | 2617868 | | 1/1989 |
| GB | 1176688 | | 1/1970 |
| JP | 63-161176 | * | 7/1988 |
| JP | 2-282485 | * | 11/1990 |
| WO | 0071784 | | 11/2000 |

OTHER PUBLICATIONS

Adrianus Jacobus Wittebrood, Jacques Hubert Olga Joseph Wijenberg, Joop Nicolaas Mooij, Nickel–plated Aluminum Brazing Sheet, Research Disclosure, No. 439, pp. 1946–1947 (Nov. 2000).

Wernick and Pinner, "The Surface Treatment and Finishing of Aluminium and its Alloys", 5th edition, vol. 2, pp. 1023–1071, Nov. 1988.

Bureau of Mines Technology, "Aluminium Soft–Soldering", 2301 N.T.I.S. Tech Notes (manufacturing), 1985, Jan. No.1G, Springfield, VA, USA pp. 12–13.

SAE Paper No. 880446 by B.E. Cheadle and K.F. Dockus Inert Atmosphere Fluxless Brazing of Aluminium Heat Exchangers, ICE, Detroit, Michigan, Feb. 29–Mar. 4, 1988 pp. 1–11.

Wernick and Pinner, "The Surface Treatment and Finishing of Aluminium and its Alloys", 5th edition, vol. 1, pp. 181–182 and pp. 191–203 (1988) (no month).

Wernick and Pinner, "The Surface Treatment and Finishing of Aluminium and its Alloys", 5th edition, vol. 2, pp. 1006–1022 (Ch. 14–15) (1988) (no month).

* cited by examiner

*Primary Examiner*—John J. Zimmerman
(74) *Attorney, Agent, or Firm*—Stevens, Davis, Miller, Mosher, LLP

(57) ABSTRACT

The invention relates to a method of manufacturing an Al or Al alloy workpiece, including the steps of (a) providing an Al or Al alloy workpiece, (b) pre-treating of the outersurface of the Al or Al alloy workpiece, and (c) plating a metal layer including nickel onto the outersurface of the pre-treated Al or Al alloy workpiece. During step (c) the metal layer including nickel is deposited by electroplating both nickel and bismuth using an aqueous bath comprising a nickel-ion concentration in a range of 10 to 100 g/l and a bismuth-ion concentration in the range of 0.01 to 10 g/l. The invention further relates to an aqueous plating bath for use in the method of this invention.

26 Claims, No Drawings

METHOD OF MANUFACTURING AN ALUMINUM PRODUCT

CROSS-REFERENCE TO RELATED APPLICATION

This is a continuation-in-part of U.S. patent application Ser. No. 09/573,980, filed May 19, 2000, now pending, incorporated herein by reference in its entirety.

FIELD OF THE INVENTION

The invention relates to a method of manufacturing an Al or Al alloy workpiece, such as a brazing sheet product, comprising the steps of providing an Al or Al alloy workpiece, pre-treating of the outersurface of the Al or Al alloy workpiece, and plating a metal layer comprising nickel onto the outersurface of the pre-treated workpiece. The invention also relates to a brazed assembly comprising at least one component made of the workpiece obtained by the method of this invention. The invention further relates to an aqueous plating bath for use in the method of this invention.

DESCRIPTION OF THE RELATED ART

For the purpose of this invention brazing sheet is to be understood as a core sheet, for example of aluminum or aluminum alloy, having on at least one side a brazeable aluminum alloy. Typical brazeable aluminum alloys useful as a clad layer are the Aluminum Association (AA) 4xxx-series alloys, typically having Si in the range of 2 to 18 weight %, and preferably in the range of 7 to 14%. The brazeable aluminum alloys may be coupled to the core alloy in various ways known in the art, for example by means of roll bonding, cladding, spray-forming or semi-continuous or continuous casting.

Controlled Atmosphere Brazing ("CAB") and Vacuum Brazing ("VB") are the two main processes used for industrial scale aluminum brazing. Industrial vacuum brazing has been used since the 1950's, while CAB became popular in the early 1980's after the introduction of the Nocolok (trade mark) brazing flux. Vacuum brazing is an essentially discontinuous process and puts high demands on material cleanliness. The disruption of the oxide layer present is mainly caused by the evaporation of magnesium from the clad alloy. There is always more magnesium present in the furnace then necessary. The excess magnesium condenses on the cold spots in the furnace and has to be removed frequently. The capital investment for suitable equipment is relatively high.

CAB requires an additional process step prior to brazing as compared to VB, since a brazing flux has to be applied prior to brazing. CAB is essentially a continuous process in which, if the proper brazing flux is being used, high volumes of brazed assemblies can be manufactured. The brazing flux dissolves the oxide layer at brazing temperature allowing the clad alloy to flow properly. When the Nocolok flux is used the surface needs to be cleaned thoroughly prior to flux application. To obtain good brazing result,, the brazing flux has to be applied on the total surface of the brazed assembly. This can cause difficulties with certain types of assemblies because of their design. For example, because evaporator type heat exchangers have a large internal surface, problems can arise because of poor access to the interior. For good brazing results the flux has to adhere to the aluminum surface before brazing. Unfortunately the brazing flux after drying can easily fall off due to small mechanical vibrations. During the brazing cycle, corrosive fumes such as HF are generated. This puts a high demand on the corrosion resistance of the materials applied for the furnace.

Ideally, a material should be available that can be used for CAB but does not have the requirements and defects of the brazing flux application. Such a material can be supplied to a manufacturer of brazed assemblies and is ready to use directly after forming of the assembly parts. No additional brazing fluxing operations have to be carried out. Presently, only one process for flux-less brazing is used on an industrial scale. The material for this process can be for example standard brazing sheet made from an AA3xxx-series core alloy clad on both sides with a cladding of an AA4xxx-series alloy. Before the brazing sheet can be used the surface has to be modified in such a way that the naturally occurring oxide layer does not interfere during the brazing cycle. The method of achieving good brazing is to deposit a specific amount of nickel on the surface of the aluminum clad alloy. If properly applied, the nickel reacts with the underlying aluminum. The nickel can be applied by using a shim of nickel between the two parts to be joined or can be deposited by electroplating. When electroplating is used the adherence of the nickel should be sufficient to withstand typical shaping operations being used in for example heat exchanger manufacture.

The processes for nickel-plating in an alkaline solution of aluminum brazing sheet are known from each of U.S. Pat. Nos. 3,970,237, 4,028,200, 4,164,454, and SAE-paper no. 880446 by B. E. Cheadle and K. F. Dockus. According to these documents, nickel or cobalt, or combinations thereof, are most preferably deposited in combination with lead. The lead addition is used to improve the wettability of the clad alloy during the brazing cycle. An important characteristic of these plating processes is that the nickel is preferentially deposited on the silicon particles of the clad alloy. To obtain sufficient nickel for brazing on the surface, the clad alloy should contain a relatively large number of silicon particles to act as nuclei for the nickel deposition. It is believed that to obtain sufficient nucleation sites before pickling a part of the aluminum in which the silicon particles are embedded should be removed by chemical and/or mechanical pre-treatment. This is believed a necessary condition to obtain a sufficient nickel coverage to serve as nuclei for the plating action of the brazing or clad alloy. On a microscopic scale the surface of the Si-containing cladding of the brazing sheet is covered with nickel globules.

However, the use of lead for the production of a suitable nickel and/or cobalt layer on brazing sheet has several disadvantages. The plating baths for electroplating are rather complex and due to the presence of lead comprising components such as salts thereof, these baths are much more environmentally unfriendly than plating baths comprising nickel- or cobalt-components alone. The use of lead for manufacturing products, such as automotive products, is undesirable and it is envisaged that in the very near future there might possibly even be a ban on lead comprising products or products manufactured via one or more intermediate processing steps comprising lead or lead-based components. A further disadvantage of the plating bath described in U.S. Pat. No. 4,028,200 is the considerable generation of ammonia fumes on the workshop floor due to the use of significant amounts of ammonia in the plating bath used.

SUMMARY OF THE INVENTION

It is an object of the present invention to provide a method of manufacturing an Al or Al alloy workpiece, comprising the steps of providing an Al or Al alloy workpiece, pretreating of the outersurface of the Al or Al alloy workpiece, and plating a metal layer comprising nickel onto the outersurface of the pre-treated Al or Al alloy workpiece, by which method a product is obtained having good brazeability and/or weldability without the mandatory addition of lead to the nickel-layer.

It is another object of the present invention to provide a method of manufacturing a brazing sheet product comprising the steps of (a) providing a sheet comprising a core sheet coupled on at least one surface of said core sheet to an aluminum clad layer, the aluminum clad layer being made of an aluminum alloy comprising silicon in an amount in the range of 2 to 18% by weight, (b) pre-treating of the outersurface of the aluminum clad layer, and (c) plating a metal layer comprising nickel onto the outersurface of the pre-treated aluminum clad layer, by which method a brazing sheet product is obtained having good brazeability without the mandatory addition of lead to the nickel-layer.

It is a further object of the present invention to provide a method of manufacturing an Al or Al alloy workpiece, ideally a brazing sheet product, the method comprising the steps of (a) providing an Al or Al alloy workpiece, in particular a brazing sheet comprising a core sheet coupled on at least one surface of said core sheet to an aluminum clad layer, the aluminum clad layer being made of an aluminum alloy containing silicon in an amount in the range of 2 to 18% by weight, (b) pre-treating of the outersurface of the Al workpiece, in particular the aluminum clad layer, and (c) plating a metal layer comprising nickel onto the outersurface of the pre-treated workpiece, in particular of the pre-treated aluminum clad layer, by which method there is no generation of ammonia fumes originating from the plating bath when operated on an industrial scale.

It is also an object of the invention to provide an aqueous plating bath for use in the method according to the invention and which can be employed in an industrial environment.

In accordance with the invention in one aspect there is provided a method of manufacturing an aluminum or aluminum alloy workpiece, the method comprising the sequential steps of (a) providing an Al or Al alloy workpiece, (b) pre-treating of the outersurface of the aluminum workpiece, and (c) plating a metal layer comprising nickel onto said outersurface of the pre-treated aluminum or aluminum alloy workpiece. This method is characterized in that during step (c) said layer comprising nickel being deposited by plating both nickel and bismuth using an aqueous bath having:

a pH in the range of 2.5 to 10, and comprising a nickel-ion concentration in a range of 10 to 100 g/l, and preferably in a range of 20 to 70 g/l, a bismuth-ion concentration in the range of 0.01 to 10 g/l, and preferably in the range of 0.02 to 5 g/l, a citrate-ion concentration in the range of 40 to 150 g/l, and preferably in the range of 80 to 110 g/l, a gluconate-ion concentration in the range of 2 to 80 g/l, and preferably in the range of 4 to 50 g/l, a chloride- or fluoride-ion concentration in the range of 1 to 50 g/l, and preferably in the range of 1 to 30 g/l.

In accordance with the invention it has been found surprisingly that the nickel layer does not need to comprise any lead as a mandatory alloying addition in order to achieve good brazeability when using the aluminum workpiece in a brazing operation. Surprisingly it has been found that equal or even better results can be obtained if bismuth is added to the nickel layer, such that said nickel layer can be kept essentially lead-free and simultaneously also in the plating bath used for the deposition of this Ni—Bi layer. By using this aqueous plating bath the need for the addition of lead has been overcome, which is a significant achievement from an environmental point of view.

This aqueous plating bath demonstrated to be operational in a very wide pH range, and can be used on industrial scale coil plating lines using a high current density, which in turn allows for fairly high line speeds. Further advantages of this plating bath are that it does not generate any ammonia fumes, it can be composed using standard and readily available chemicals, and bismuth can easily be replenished to the plating bath from a bismuth concentrate or otherwise.

Preferably said layer comprising nickel being deposited by plating both nickel and bismuth using am aqueous bath comprising a nickel-ion concentration in a range of 20 to 70 g/l and a bismuth-ion concentration in the range of 0.02 to 5 g/l.

The nickel-ion concentration to the aqueous bath can be added via the addition of nickel chloride, nickel fluoborate, nickel sulfamate, nickel acetate or nickel sulphate. However, there is a preference to use the addition of nickel sulfate ($NiSO_4.6H_2O$). At a too high level of nickel salt in the aqueous bath there is the risk of the crystallization of the salt in the solution, which might damage a continuous process. At too low levels the resultant bath becomes uneconomical due to too long plating times and low current density.

Bi-ion in the concentration set out above can be added in various ways to the aqueous bath. In theory many bismuth compounds could be used for this purpose. However, many bismuth compounds have been tried out but only a very few appear to provide reliable and reproducible results. For example the addition of bismuth acetate has been tried, but it has been found that this compound did not dissolve in the plating bath used, whereas the addition of lead acetate did not result in any problems with respect to having this compound dissolved. For example also the combination of a bath of nickel-ions and bismuth-ions and a tartrate at a pH in the range of more than 8 resulted in the formation of an undesirable Ni containing sludge. This Ni containing sludge did not re-dissolve upon heating, indicating amongst others that Ni is unstable in the presence of a tartrate in the mentioned pH range. In accordance with the invention very good results have been obtained when Bi-ions are being added via the addition of one or more of the group consisting of bismuth carbonate ($Bi_2(CO_3)_3$), bismuth oxide ($Bi_2O_3$), bismuth citrate ($BiC_6H_5O_7$) and bismuth chloride ($BiCl_3$). Optionally some sodium hydroxide may be added also to regulate the pH of the aqueous bath. By using bismuth carbonate or bismuth oxide in the presence of nickel a suitable plating bath has been obtained which is stable at a very wide pH range. At too high levels of Bi-ion concentration in the aqueous bath the resultant deposit has a undesired high Bi-concentration. Preferably the Bi-concentration in the resultant Ni—Bi layer on the brazing sheet product is not more than 5 percent by weight, and preferably not more than 3 percent by weight. At too low levels the resultant bath becomes uneconomical due to too long plating times and low current density.

Preferably in the workpiece, in particular a brazing sheet product, the layer comprising nickel and bismuth has a thickness up to 2.0 $\mu$m, preferably in the range of 0.03 to 1.0 $\mu$m, and more preferably in the range of 0.05 to 0.5 $\mu$m. A coating thickness of greater than 2.0 $\mu$m requires a prolonged treatment time for plating, and may result in wrinkling of the molten filler material during subsequent brazing operations. A preferred thickness for this Ni—Bi containing layer is 0.3 µm. Also other techniques such as roll bonding, thermal spraying, Chemical Vapor Deposition and Physical Vapor Deposition or other techniques for depositing of metal or metal alloys from a gas or vapor phase may be used.

Baths using the following salts have proved particularly effective, in grams per liter:

Nickel sulphate in a range of 45 to 450 g/l, and preferably 90 to 315 g/l,

Chloride-ion concentration in a range of 1 to 50 g/l, and preferably 1 to 30 g/l, Sodium citrate in a range of 55 to 180 g/l, and preferably 110 to 150 g/l, Sodium gluconate in range of 2 to 90 g/l, and preferably 5 to 55 g/l, Ammonium sulphate in a range up to 270 g/l, Bismuth oxide in a range of 0.02 to 22 g/l, and preferably 0.05 to 11 g/l, or Bismuth carbonate in a range of 0.03 to 29 g/l, and preferably 0.06 to 14 g/l.

The addition of an ion from the group consisting of chloride and fluoride is required for inducing: anode corrosion. A suitable source of chloride-ion concentration can be done by the addition of nickel chloride ( $NiCl_2.6H_2O$) in a range of up to 415 g/l, and preferably in a range up to 250 g/l.

($H^+$) or ($OH^-$) can be added to regulate the pH in a range of 2.5 to 10. The use of ammonium hydroxide should preferably be avoided in view of the generation of ammonia fumes.

Optionally for reducing stress in the deposit layer comprising the Ni and Bi an ammonium-ion concentration in a range up to 40 g/l, and preferably in range of 1 to 25 g/l, or a triethenalamine-ion concentration in a range of up to 40 g/l, or combinations thereof, or other equivalent components may be added to the aqueous bath. Any soluble ammonium salt can be used as a source of $NH_4^+$.

The plating bath used in the method according to the invention can operate in a wide pH range of 2.5 to 10, and preferably in the range of 4 to 8, without affecting the properties of the bath and without dissolving the aluminum clad layer or any other metal layer thereon. If the aluminum workpiece, such as a brazing sheet product having an aluminum clad layer, is provided with a thin intermediate zinc layer, e.g. by means of a zincate treatment via direct or immersion plating, prior to the plating of the Ni—Bi layer, the pH is preferably in the range of 5 to 8, and more preferably in the range of 5.4 to 7.5. In the embodiment of an applied intermediate layer comprising zinc, the layer has a thickness up to 0.5 µm, more preferably up to 0.3 µm (300 nm), and most preferably in the range of 0.01 to 0.15 µm (10–150 nm). In the best results obtained a thickness of about 30 nm has been used. A coating thickness of greater than 0.5 µm requires a prolonged treatment time, e.g. for displacement plating, and is thought to have no further advantages for improving the adhesion. Instead of zinc also tin may be used.

The method according to the invention is preferably employed using a plating bath having a temperature in the rang of 30 to 70° C., and more preferably in the range of 40 to 65° C. In this temperature range the ion-mobility increases and there is no need to cool the plating bath to compensate for the heat generation during plating.

The invention further relates to an aqueous bath for the electro-deposition of a layer comprising both a nickel and bismuth on a brazing sheet product having:

a pH in the range of 2.5 to 10, and comprising a nickel-ion concentration in the range of 10 to 100 g/l, and preferably in a range of 20 to 70 g/l, a bismuth-ion concentration in the range of 0.01 to 10 g/l, and preferably in a range of 0.02 to 5 g/l, a citrate-ion concentration in the range of 50 to 150 g/l, and preferably in a range of 80 to 110 g/l, a gluconate-ion concentration in the range of 2 to 80 g/l, and preferably in a range of 4 to 50 g/l, a chloride- or fluoride-ion concentration in the range of 1 to 50 g/l, and preferably in a range of 1 to 30 g/l.

This aqueous plating bath demonstrated to be operational in a very wide pH range, and at a wide temperature range, and further can be used on industrial scale coil plating lines using a high current density, which in turn allows for fairly high line speeds. Further advantages of this plating bath are that it does not generate any ammonia fumes, it can be composed used standard and readily available chemicals, and the bismuth concentration can easily be replenished to the plating bath from a bismuth concentrate or otherwise.

The adhesion of the layer comprising both nickel and bismuth to the aluminum workpiece, such as the cladding of a brazing sheet product, is fairly good, but may be further improved by a proper pre-treatment of the outersurface of the aluminum workpiece on which the Ni—Bi layer is being deposited, such as the clad layer of a brazing sheet product. The pre-treatment comprises a preliminary cleaning step during which the surface is made free from grease, oil, or buffing compounds. This can be accomplished in many ways, and can be accomplished amongst others by vapor degreasing, solvent washing, or solvent emulsion cleaning. Also a mild etching may be employed. Following the preliminary cleaning, the surface should preferably be conditioned. Several methods can be applied successfully, such as, but not limited thereto:

(a) acid desmutting in an solution comprising nitric acid (typically 25–50%), optionally in combination with a fluoride and/or chromic acid and/or sulphuric acid. Suitable sources for the fluoride can be, for example, hydrofluoric acid or ammonium bifluoride, see also e.g. "The surface treatment and finishing of aluminum and its alloys", by S. Wernick et al., ASM international, 5th edition, 1987, Vol.1, pp.181–182.

(b) mechanical preparation such as polishing, abrasion or brushing. These may also be applied while the surface is in contact with a lower alcohol, such as for example isopropanol, see e.g. also U.S. Pat. No. 4,388,159.

(c) alkaline etching, see e.g. "The surface treatment and finishing of aluminum and its alloys", by S. Wernick et al., ASM international, 5th edition, 1987, Vol.1, pp.191–203.

(d) aqueous detergent cleaning;

(e) anodic oxidation, see e.g. "The surface treatment and finishing of aluminum and its alloys", by S. Wernick et al., ASM International, 5th edition, 1987, Vol.2, pp.1006 ff.

(f) electrograining.

(g) pre-treatments described in for example U.S. Pat. Nos. 4,741,811, 5,245,847, 5,643,434.

(h) immersion processes such as zincate and stannate, see "The surface treatment and finishing of aluminum and its alloys", by S. Wernick et al., ASM international, 5th edition, 1987, Vol.2, Chapter 14 and 15.

Also combinations of one or more conditioning steps set out above can be applied successfully.

In an embodiment the Al or Al alloy workpiece is an aluminum alloy sheet or aluminum alloy wire or aluminum alloy rod. Although various aluminum alloys may be applied, e.g. those within the Aluminum Association (AA) 3xxx- and AA6xxx-series aluminum alloys. Particular suitable aluminum alloys are those within the AA4xxx-series alloys, typically having Si as the most important alloying element in the range of 2 to 18% by weight, more preferably 7 to 14% by weight. Other alloying elements may be present to improve specific properties, the balance is made by iron up to 0.8%, and impurities each up to 0.05 wt. %, total up to 0.20 wt. %, and aluminum. An AA4xxx-series aluminum alloy sheet can be plated with Ni—Bi alloy in accordance with the method of the invention, and may be employed in subsequent brazing operations, in particular in an inert atmosphere brazing (CAB) operation in the absence of a brazing-flux material. Also aluminum alloy wire or rods being made of an AA4xxx-series alloy may be plated with a Ni—Bi layer, and subsequently employed in brazing operations in particular in an inert atmosphere brazing (CAB) operations in the absence of a brazing-flux material, and may also be employed as weld filler wire or weld filler rod in a welding operation.

In a preferred embodiment the aluminum alloy workpiece is a brazing sheet product comprising a core sheet coupled at least one surface of said core sheet to n aluminum clad layer, the aluminum clad layer being made of an aluminum AA4xxx-series alloy comprising silicon in the range of 2 to 18% by weight, preferably in the range of 7 to 14%. In an embodiment of the aluminum brazing sheet product, the core sheet is made of an aluminum alloy, in particular those within the AA3xxx, AA5xxx, or AA6xxx-series alloys.

The invention further provides a brazed assembly comprising at least one component made of the aluminum alloy workpiece, in particular a brazing sheet product, obtained by the method in accordance with the invention described above. Preferably the resultant brazing sheet product has a Ni—Bi layer comprising Bi, by weight percent, in a range of up to 5%, preferably not more than 3%, and more preferably up to 1.0%, and most preferably in a range of 0.01 to 0.05%.

In an embodiment there is provided a brazed assembly wherein at least one of the parts to be joined by brazing is made of the aluminum alloy workpiece, in particular a brazing sheet product, produced by the method in accordance with the invention described above, and at least one other part is made of steel, aluminized steel, stainless steel, plated or coated stainless steel, bronze, brass, nickel, nickel alloy, titanium, or plated or coated titanium.

In a further aspect of the invention there is provided in a method of manufacturing a brazed assembly using the aluminum alloy workpiece, in particular a brazing sheet product, produced by the method in accordance with this invention, comprising the steps of:
(a) shaping or forming parts of which at least one is made from the aluminum alloy workpiece, ideally a brazing sheet product, obtained by the method in accordance with this invention as set out above;
(b) assembling the parts into the assembly;
(c) brazing the assembly under a vacuum or in an inert atmosphere (CAB) in the absence of a brazing-flux at elevated temperature for a period long enough for melting and spreading of the molten filler alloy;
(d) cooling the brazed assembly to below 100° C. The cooling rate may be in the range of typical brazing furnace cooling rates. Typical cooling rates are cooling rates of at least 10° C./min or more.

In dependence on the material, particularly aluminum alloy, of the cores sheet the process may include the further processing step (e) of aging of the brazed and cooled assembly in order to optimize the mechanical and/or corrosion properties of the resultant assembly. The use of the brazing sheet product obtained from the method according to the invention set out above has been found to result in a lower brazing temperature by at least 10° C. This reduced brazing temperature allows a significant reduction of the industrial scale processing time of a complete brazing cycle, typically a time reduction of 15% or more has been found.

In an embodiment of the method of manufacturing a brazed assembly in step (a) at least one of the parts to be joined by brazing is made of the brazing sheet product produced by the method in accordance with the invention described above, and at least one other part is made of steel, aluminized steel, stainless steel, plated or coated stainless steel, bronze, brass, nickel, nickel alloy, titanium, or plated or coated titanium.

EXAMPLE

On a laboratory scale of testing aluminum brazing sheets manufactured from an AA3003 core alloy clad on both sides with an AA4045 clad alloy, and having a total thickness of 0.5 mm and a clad layer thickness of 50 microns each, was treated using the following sequential process steps:

cleaning by immersion for 180 sec. in ChemTec 30014 (a commercial available alkaline (etch) degreaser), followed by rinsing;

alkaline etching for 20 sec. in ChemTec 30203 (a commercial available alkaline etch cleaner) at ambient temperature, followed by rinsing;

desmutting for 4 sec. in an acidic oxidizing bath, typically 25–50 vol. % nitric acid, comprising ChemTec 11093 (a commercial available pickle activator) at ambient temperature, followed by rinsing;

nickel electroplating, and rinsing.

The nickel plating bath used has the composition of Table 1 and having a pH of 5.5. The Bi-ion concentration has been added to the plating bath using a Bi-ion concentrate of 160 g/l sodium hydroxide, 300 g/l sodium gluconate and 110 g/l bismuth oxide. The, bismuth oxide could have been replaced also by bismuth carbonate. The electroplating of a Ni—Bi layer was performed at 57° C. using three different current densities and plating times. The composition of the resultant layer was measured using ICP and is given in Table 2. ICP stands for Induced Coupled Plasma. The results given are for the sum of both plated sides.

For comparison similar brazing sheet material has been Ni-plated with Ni—Pb. The plating bath comprised 50 g/l nickel sulphate, 50 g/l nickel chloride, 100 g/l/ sodium citrate, 1 g/l lead acetate, and 75 ml/l ammonium hydroxide (30%). The plating conditions at 26° C. were such that a plating time of 200s resulted in a nickel-lead plated layer of 2.0 microns using a current density of 3 A/dm$^2$. Due to the presence of ammonium-hydroxide ammonia fumes are being generated.

The nickel plated specimens have been tested for adhesion using the Erichsen dome test (5 mm), and the T-bend test. A value assessment is then given to the adhesion where: (−)=poor, (±)=fair, and (+)=good. The results are given in Table 2. Further the brazeability has been assessed. On a laboratory scale of testing the brazing tests were carried out in a small quartz furnace. Small coupons of 25 mm×25 mm were cut from the nickel-plated sheets. A small strip of an AA3003 alloy measuring 30 mm×7 mm×1 mm was bent in the center to an angle of 45° and laid on the coupons. The strip-on-the-coupon samples were heated under flowing nitrogen, with heating from room temperature to 580° C., dwell time at 580° C. for 1 minute, cooling from 580° C. to room temperature. The brazing process was judged on possible formation of wrinkles, capillary depression and fillet formation. An overall assessment was given where: (−)=poor brazeability, (−/±)=fair brazeability, (±)=good brazeability, and (+)=excellent brazeability. The results obtained are summarized in Table 2.

This example shows how an electroplated nickel layer containing Bi, but comprising no Pb, may be applied and resulting in a product having at least a fair adhesion of the nickel layer and excellent brazeability. Normally bismuth is not easily maintained in a stable nickel-plating solution without sludge formation.

It will be apparent to the skilled person that the Ni—Bi plating operations according to the invention may be applied also on one or both sides of an aluminum alloy sheet or strip made of an AA4xxx-series aluminum alloys, which aluminum alloy sheet is not being provided with a core sheet to form a brazing sheet product. Such a Ni—Bi plated sheet or strip, typically having a gauge in the range of up to 3 mm, preferably in the range of 0.05 to 2 mm, may be employed also in a brazing operation as set out in this example. A similar approach can be used for plating aluminum alloy wires or rods. Such Ni—Bi plated wires or rods may be employed in a brazing operation as set out in this example or used as filler material in a welding operation, such as for laser welding operations.

The current efficiency of Ni deposition appears to be 100%.

The samples plated with Ni—Bi at 3 A/dm$^{-2}$ showed some black spots, but the samples plated at the higher current densities have excellent appearance. About 0.5 g.m$^{-2}$ bismuth was deposited. The bismuth content of the deposited alloy layer can easily be varied, e.g. by lowering the bismuth concentration in the plating bath, to give a lower Bi content.

This plating bath has many advantages compared to the standard known Pb-containing baths:

no ammonia fumes more practical operating temperatures, typically 40 to 70° C.

high current density bismuth can easily be replenished to the plating bath.

Further, standard chemicals were employed.

TABLE 1

| Compound | Concentration [g/l] |
| --- | --- |
| Nickel sulphate | 142 |
| Ammonium sulphate | 34 |
| Nickel chloride | 30 |
| Sodium citrate | 140 |
| Sodium gluconate | 30 |
| Bismuth ions | 1 |

TABLE 2

| Invention | Current Density [A/dm$^2$] | Time [sec.] | Ni [g/m$^2$] | Bi [g/m$^2$] | Adhesion | Brazeability |
| --- | --- | --- | --- | --- | --- | --- |
| yes | 3 | 50 | 9.1 | 0.66 | ± | + |
| yes | 6 | 25 | 10.4 | 0.50 | ± | + |
| yes | 10 | 15 | 9.5 | 0.46 | ± | + |
| no | 3 | 50 | 9.4 | — | ± | + |

Having now fully described the invention, it will be apparent to one of ordinary skill in the art that many changes and modifications can be made without departing from the spirit or scope of the invention as herein described.

What is claimed is:

1. A method of manufacturing an Al or Al alloy workpiece comprising the steps of (a) providing an Al or Al alloy workpiece, (b) pre-treating the outersurface of the Al or Al alloy workpiece, and (c) plating a metal layer comprising nickel onto said outersurface of the Al or Al alloy workpiece, wherein during step (c) said metal layer comprising nickel is deposited by plating both nickel and bismuth using an aqueous bath having a pH in the range of 2.5 to 10, and comprising a nickel-ion concentration in a range of 10 to 100 g/l, a bismuth-ion concentration in the range of 0.01 to 10 g/l, a citrate-ion concentration in the range of 40 to 150 g/l, a gluconate-ion concentration in the range of 2 to 80 g/l, a chloride- or fluoride-ion concentration in the range of 1 to 50 g/l.

2. A method according to claim 1, wherein the nickel-ion concentration is in the range of 20 to 70 g/l.

3. A method according to claim 1, wherein the bismuth-ion concentration is in the range of 0.02 to 5 g/l.

4. A method according to claim 1, wherein the aqueous bath and the resultant metal layer comprising nickel are essentially lead-free.

5. A method according to claim 1, wherein the gluconate-ion concentration is in the range of 4 to 50 g/l.

6. A method according to any of claim 1, wherein said layer comprising nickel has a thickness of not more than 2.0 microns.

7. A method according to any of claim 1, wherein said layer comprising nickel has a thickness in the range of 0.03 to 1.0 micron.

8. A method according to claim 1, wherein said layer comprising nickel has a thickness in the range of 0.05 to 0.5 microns.

9. A method according to claim 1, wherein the Bi-ion concentration results from the dissolution of one or more selected from the group consisting of bismuth carbonate, bismuth oxide, bismuth citrate and bismuth chloride.

10. A method according to claim 1, wherein the temperature of the aqueous bath during plating is in the range of 30 to 70° C.

11. A method according to claim 1, wherein the workpiece is an aluminum alloy sheet or aluminum alloy wire or rod.

12. A method according to claim 1, wherein the aluminum alloy comprises silicon as an alloying element in the range of 2 to 18% by weight.

13. A method according to claim 1, wherein the workpiece is a brazing sheet product comprising a core sheet coupled on at least one surface of said core sheet to an aluminum clad layer, the aluminum clad layer being made of an aluminum alloy comprising silicon in an amount in the range of 2 to 18% by weight, and wherein during step (b) at least the outersurface of the aluminum clad alloy is being pre-treated.

14. A method according to claim 1, wherein the workpiece is a brazing sheet product comprising a core sheet being made of an AA3xxx, AA5xxx, or AA6xxx-series alloy coupled on at least one surface of said core sheet to an aluminum clad layer, the aluminum clad layer being made of an aluminum alloy comprising silicon in an amount in the range of 2 to 18% by weight, and wherein during step (b) at least the outersurface of the aluminum clad alloy is being pre-treated.

15. A method according to claim 1, wherein the workpiece is a brazing sheet product comprising a core sheet being made of an AA3xxx, AA5xxx, or AA6xxx-series, alloy coupled on at least one surface of said core sheet to an aluminum clad layer, the aluminum clad layer being made of an aluminum alloy comprising silicon in an amount in the range of 2 to 18% by weight, and wherein during step (b) at least the outersurface of the aluminum clad alloy is being pre-treated by applying a thin zinc layer having a thickness of not more than 0.3 micron.

16. A method according to claim 1, wherein the workpiece is a brazing sheet product comprising a core, et being made of an AA3xxx, AA5xxx, or AA6xxx-series alloy coupled on at least one surface of said core sheet to an aluminum clad layer, the aluminum clad layer being made of an aluminum alloy comprising silicon in an amount in the range of 2 to 18% by weight, and wherein during step (b) at least the outersurface of the aluminum clad alloy is being pre-treated by applying a thin zinc layer having a thickness in the range of 10 to 150 nm.

17. An aqueous bath for the electrodeposition of a layer of nickel and bismuth on an Al or Al alloy workpiece, having a pH in the range of 2.5 to 10, and comprising a nickel-ion concentration in a range of 10 to 100 g/l, a bismuth-ion concentration in the range of 0.01 to 10 g/l, a citrate-ion concentration in the range of 50 to 150 g/l, a gluconate-ion concentration in the range of 2 to 80 g/l, a chloride- or fluoride-ion concentration in the range of 1 to 50 g/l.

18. An aqueous bath according to claim 17, wherein the nickel-ion concentration is in the range of 20 to 70 g/l.

19. An aqueous bath according to claim 17, wherein the bismuth-ion concentration is in the range of 0.02 to 5 g/l.

20. An aqueous bath according to claim 17, wherein the gluconate-ion concentration is in the range of 4 to 50 g/l.

21. An aqueous bath according to claim 17, wherein the following salts have been used, in grams per liter: nickel sulphate in a range of 45 to 450 g/l, chloride-ion concentration in a range of 1 to 50 g/l, sodium citrate in a range of 55 to 180 g/l, sodium gluconate in range of 2 to 90 g/l, ammonium sulphate in a range up to 270 g/l, bismuth oxide in a range of 0.02 to 22 g/l, or bismuth carbonate in a range of 0.03 to 29 g/l.

22. A method of use of the aqueous bath of claim 17 for the manufacturing of Ni— plated products for use in a brazing operation, comprising plating a metal layer comprising nickel onto an outersurface of an Al or Al alloy workpiece, wherein during said plating said metal layer comprising nickel is deposited by plating both nickel and bismuth using the aqueous bath.

23. A method of use of the aqueous bath of claim 17 for the manufacturing of Ni— plated brazing sheet products, comprising plating a metal layer comprising nickel onto an outersurface of an Al or Al alloy workpiece, wherein during said plating said metal layer comprising nickel is deposited by plating both nickel and bismuth using the aqueous bath.

24. An assembly of components joined by brazing, at least one said components being an Al or Al alloy workpiece produced by the method in accordance with claim 1.

25. Method of manufacturing an assembly of brazed components, comprising the steps of:

(a) shaping parts of which at least one is made from an Al or Al alloy workpiece obtained by the method according to claim 1;

(b) assembling the parts into the assembly;

(c) brazing the assembly in an inert atmosphere in the absence of a brazing-flux at elevated temperature for a period long enough for melting and spreading of the molten filler;

(d) cooling the brazed assembly to below 100° C.

26. A method according to claim 25, wherein at least one other component is selected from the group consisting of steel, aluminized steel, stainless steel, plated or coated stainless steel, bronze, brass, nickel, nickel alloy, titanium, and plated or coated titanium.

* * * * *